United States Patent [19]

Elson et al.

[11] 3,935,525
[45] Jan. 27, 1976

[54] BATTERY CHARGING CIRCUIT WITH THERMOSTAT CONTROL

[75] Inventors: Donald Edwin Elson, Timonium; Richard Thomas Walter, Baltimore, both of Md.

[73] Assignee: The Black and Decker Manufacturing Company, Towson, Md.

[22] Filed: Sept. 30, 1974

[21] Appl. No.: 510,391

[52] U.S. Cl. ............................ 320/35; 320/22
[51] Int. Cl.² ........................................ H02J 7/00
[58] Field of Search ............ 320/22, 35, 36, 54, 55, 320/30, 31

[56] References Cited
UNITED STATES PATENTS

| | | | |
|---|---|---|---|
| 2,296,924 | 9/1942 | Heyer et al. | 320/36 X |
| 2,354,877 | 8/1944 | Peters | 320/35 X |
| 2,369,826 | 2/1945 | Heyer et al. | 320/36 X |
| 2,796,577 | 6/1957 | Arnot | 320/36 X |
| 3,312,889 | 4/1967 | Gold | 320/54 X |

Primary Examiner—J. D. Miller
Assistant Examiner—Robert J. Hickey
Attorney, Agent, or Firm—Edward D. Murphy; Joseph R. Slotnik; Leonard Bloom

[57] ABSTRACT

The embodiment of the battery charging circuit disclosed herein employs a relay which can be operated both mechanically and electrically. Mechanical operation is achieved by a manually operable push button which when depressed closes a relay contact in series with the relay winding. Current then flows into the winding to actuate the relay and provide a current path for the fast charge of a battery. If the battery temperature is elevated above a level considered safe for recharging, fast charging of the battery cannot occur until the battery has cooled. If the push button is depressed while the battery temperature is so elevated, it still closes the relay contact but no current flows into the winding. However, the push button is maintained in a depressed position by engagement with the relay armature. Once the battery cools, the already closed relay contact permits current to flow into the winding to actuate the relay and initiate a fast charge.

13 Claims, 3 Drawing Figures

BATTERY CHARGING CIRCUIT WITH THERMOSTAT CONTROL

BACKGROUND OF THE INVENTION

This invention relates to improvements in battery charging circuits. More particularly, this invention relates to a battery charging circuit in which the flow of charging current into the battery is controlled by a battery condition, such as, for example, battery temperature. The control which is effected is the automatic selection of either a high or low rate of charge as determined by the aforesaid battery condition.

It is a common practice in charging discharged batteries to provide a "fast" charge and then to reduce the charging current to a minimum steady flow, commonly known as a "trickle" current, when the battery approaches full strength. The reduction of the high charging current becomes imperative with regard to certain batteries because not only is permanent damage to the battery likely but in some cases, most notably that of nickel-cadmium (Ni-Cd) batteries, venting can occur, resulting in rapid deterioration of the battery.

With particular reference to a Ni-Cd battery for ease of description, the attainment of a full charge is accompanied by a sudden increase in battery temperature. This abrupt temperature change is a condition which has been used previously in battery charging circuits to terminate charging. As an example as to how this is accomplished, a thermostat can be thermally coupled to the battery to sense this temperature increase, and the thermostat contacts are connected electrically in series with a relay. Once a preset temperature level is attained, the thermostat contacts open and cause the relay to de-energize which action opens the charge path through which the fast charge of the battery was being effected. In this way the high charging current is eliminated and a trickle charge is then applied to the battery. The battery can now be removed from the charger and inserted into the desired battery-driven equipment, or if the charging circuit is built into the battery-driven equipment, an appropriate switch can be operated to transfer the battery from a charging state to an operational state.

While an arrangement as discussed above is useful under normal circumstances, there are disadvantages with this arrangement which have become apparent in practice. After the battery becomes charged, it often occurs that the battery is put into immediate operation and is discharged at a sufficient rate to keep the battery temperature above the level at which the thermostat contacts close. If this battery, having again become discharged, is immediately placed in the charging circuit, and a switch actuated to initiate what should be a fast charge, high current flow does not occur because the thermostat contacts are open. This then requires the user of the equipment to wait until the battery cools sufficiently for the thermostat contacts to close, and then to actuate the charging cycle to initiate the desired fast charge. If prior to the cooling of the battery, any attempt is made to override or bypass the thermostat in order to achieve a fast charging mode, there is as pointed out above, a strong likelihood of battery destruction or venting.

SUMMARY OF THE INVENTION

The problems of the prior art are overcome by a novel battery charging circuit which includes a relay with manual intervention and a battery temperature sensitive means. The feature of manual intervention provides the charging circuit with a memory when a hot battery is connected in the charging circuit. Once the battery cools down to a safe temperature level, fast charging is automatically effected by operation of the relay in response to the coincident functioning of the memory and the battery temperature sensitive means.

The objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the battery charging circuit of this invention comprises a first current path for the current supplied by the source and adapted to contain the battery to be charged; a second current path for the current supplied by the source; a relay having a winding connected in said second current path; coincidence means for completing the second current path and permitting current flow through said relay winding to actuate said relay, including a manually operable switch, and a thermostat thermally coupled to the battery and designed to be actuated when the battery temperature is below a predetermined temperature, the second current path being completed when both said manually operable switch and said thermostat are closed; and means responsive to the actuation of said relay for permitting current flow through said first current path to said battery.

Preferably, the permitting means includes a first normally-open contact of said relay which closes the first current path in response to the electrical actuation of said relay, and said relay further comprises a second normally-open contact operably connected to said second current path, said manually operable switch being coupled to said second contact to effect manual closure of said second contact upon actuation of said manually operable switch.

It is preferred that the thermostat has contacts connected in series with said relay winding in said second current path, said contacts being closed when said battery temperature is below said predetermined temperature.

It is also preferred that the manually operable switch includes a detent positioned to contact and move said armature upon actuation of said manually operable switch to effect closure of said second contact, and said armature includes a bar formed thereon which engages said detent upon actuation of said manually operable switch and which releases said detent upon movement of said armature in response to the electrical actuation of said relay.

The invention consists in the novel circuit, parts, constructions, arrangements, combinations and improvements shown and described. The accompanying drawings which are incorporated in and constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
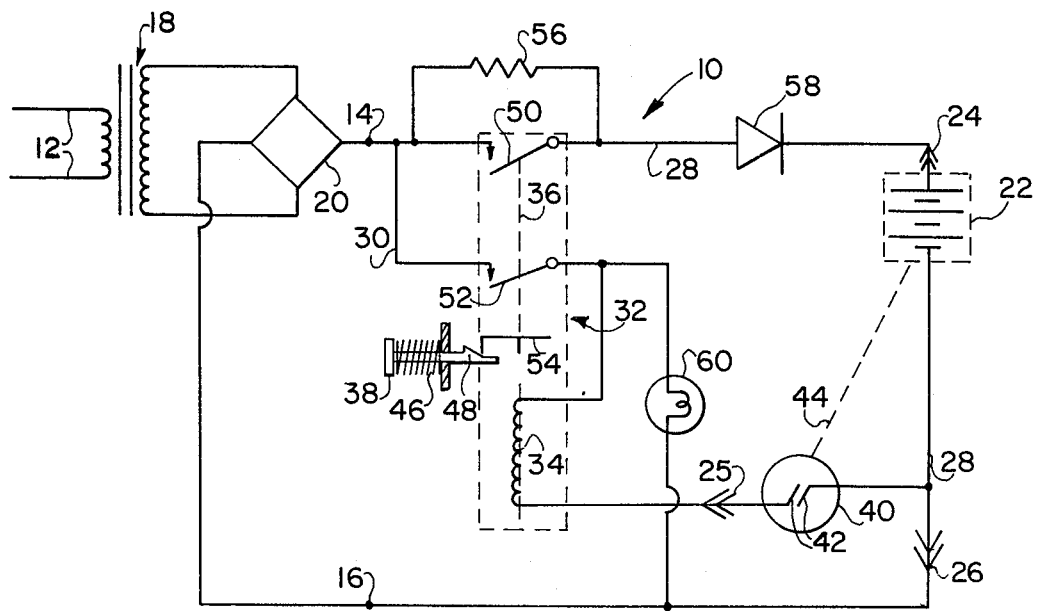
FIG. 1 is a circuit schematic of the preferred embodiment of the present invention.

Referring now to FIG. 1, there is shown a battery charging circuit indicated generally by the numeral 10 and adapted to be supplied with a source of current. Although many current sources can be used, the current source is here depicted as a transformer-rectifier combination for receiving AC line voltage on input lines 12 and providing a DC output to the charging circuit at junctions 14 and 16. The transformer 18 is preferably voltage regulated and current limited, and the rectifier 20 is preferably a full-wave rectifying bridge to supply a substantially constant output to junctions 14 and 16 on the DC side of the bridge.

The charging circut 10 is designed to charge a battery, such as shown schematically at 22, by the application of current supplied by the aforementioned current source. Battery 22 is shown as being removably connected in circuit 10 at plugs 24, 25 and 26. This feature permits a battery 22 with a thermostat to be inserted into circuit 10 to receive a charge and thereafter to be removed from the circuit once recharging has been completed. This preferred arrangement, however, is not to be construed as limiting to the invention, as this circuit also finds utility in apparatus where the battery is not removed for recharging but is switched by suitable means between a charging state and an operational state.

In accordance with the invention, the battery charging circuit 10 includes first and second current paths for the current supplied by the source. The first current path, identified by numeral 28, is adapted to contain the battery 22 which is to be charged, and as embodied here is connected between junctions 14 and 16. Current 28 is, therefore, the path through which charging current is designed to flow. In contrast the second current path 30, as embodied herein, is used to control the amount of current which flows in the path 28 and thus controls the rate of charging of battery 22, e.g., fast charge or trickle charge. Preferably, path 30 is also connected to the current source at junctions 14 and 16 and thus is in parallel with path 28.

In accordance with the invention, a relay is provided having a winding connected in the second current path. As embodied here, a relay indicated generally by the numeral 32 forms a part of the battery charging circuit and includes a relay winding 34 serially connected in current path 30. Relay 32 is provided with an armature 36 electromagnetically coupled to the winding 34 and which moves in response to the energization and deenergization of the winding, as caused respectively by the presence and absence of current in path 30.

In accordance with the invention, coincidence means are provided for completing the second current path and permitting current flow through the relay winding to actuate the relay. This coincidence means includes a manually operable switch 38 and a thermostat 40. The thermostat 40 is thermally coupled to the battery and is designed to be actuated whenever the battery temperature is below a predetermined temperature.

Specifically, while a snap action thermostat with a differential between opening and closing temperatures might be used, it is preferred to use a thermostat which is normally closed and which opens at 113°F and which closes at substantially the same temperature. Since the sensed temperature actually continues to rise after fast charge has stopped, thermostat chatter is avoided and the zero differential thermostat avoids the possibility that the thermostat may remain constantly open under certain climatic conditions.

As here embodied, the thermostat 40 has a pair of contacts 42 connected in series with relay winding 34 in current path 30. The thermal connection between thermostat 40 and battery 22 is represented by broken line 44 and permits thermostat 40 to track closely the temperature of the battery. The thermostat can simply be thermally connected to the battery case, but as a matter of design preference, the thermostat is formed as part of the battery package and is positioned on the exterior of the battery. In the latter case, the circuit 10 is provided with an additional plug terminal 25 to facilitate connection of the thermostat contacts in path 30 when the battery is plugged into the circuit for recharging.

To complete the second current path 30, both the manually operable switch 38 and the thermostat 40 must be closed. The contacts 42 are here embodied to close automatically when the temperature of the battery 22 is below a predetermined level. Switch 38 is designed for manual operation and can be actuated anytime recharging of battery 22 is desired. Switch 38 is here embodied as a push button which is biased outwardly or towards the disengaged position by spring 46. The inner end of switch 38 is provided with a detent 48.

In accordance with the invention there are means provided responsive to the actuation of the relay for permitting current flow through the first current path to the battery. As here embodied, said permitting means includes a first normally-open contact 50 of relay 32. Contact 50 is connected in current path 28 in series with battery 22 and closes to complete this path in response to the electrical actuation of the relay. Closure of contact 50 is preferably in response to movement of relay armature 36 which is coupled to contact 50. As viewed in FIG. 1, armature 36 moves upwardly when relay winding 34 is energized to close contact 50, and moves downwardly when winding 34 is deenergized to open contact 50.

As here embodied, relay 32 additionally comprises a second normally-open contact 52 is operably connected to current path 30. Preferably, contact 52 is directly connected in current path 30 in series with the relay winding 34 and thermostat contacts 42. Armature 36 is coupled to contact 52 so that this contact moves in unison with contact 50 upon electrical actuation of relay 32. It should be noted that the distance which contact 52 travels in closing is preferably designed to be less than the distance traveled by contact 50.

In the present embodiment, relay contact 52 and the manually operable switch 38 are coupled together to effect manual closure of contact 52 upon actuation of switch 38. This relationship between contact 52 and switch 38 is separate and apart from the movement of switch 52 by armature 36 in response to relay operation. Manual closure of contact 52 is obtained by detent 48 which is positioned to contact and move armature 36 when switch 38 is actuated.

Figure 2:
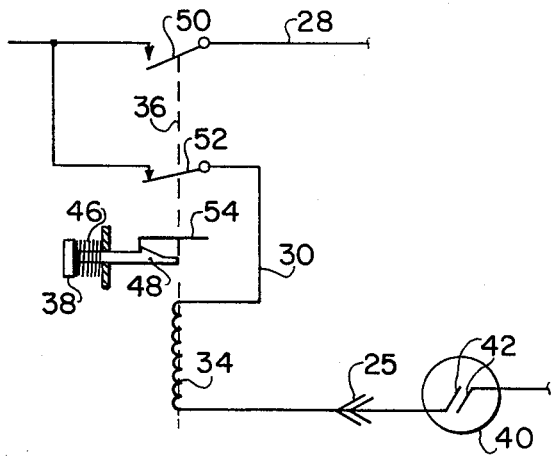
FIG. 2 shows the latching relay and thermostat portion of the circuit of FIG. 1 following operation of the manual switch.
Figure 3:
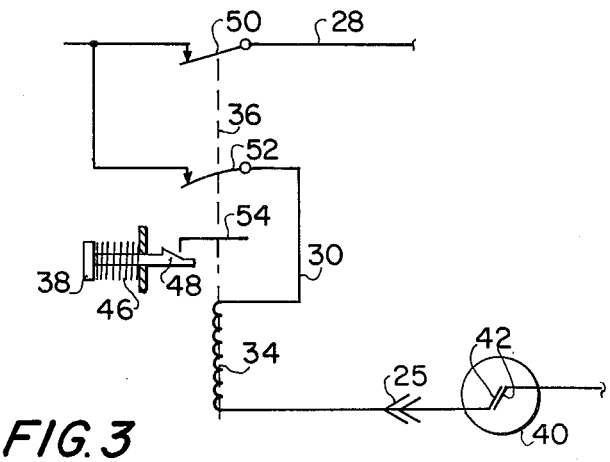
FIG. 3 is the partial circuit of FIG. 2 following closure of the thermostat contacts.

With additional reference to FIGS. 2 and 3, detent 48 is shaped as a wedge, and armature 36 is provided with bar 54 which contacts one end of the detent when switch 38 is in the unactuated position. When switch 38 is depressed, arm 54 rides up the ramp of the wedge-shaped detent 48 and causes an upward movement of armature 36. Contact 52 closes, but contact 50 does not close because of its having to travel a greater distance than switch 52.

When switch 38 is depressed to close contact 52, one of two operations can occur. First, if the contacts 42 of the thermostat 40 are open, there is no coincidence of operation of switch 38 and thermostat 40. In such case, detent 48 is latched, by the arm 54 of armature 36 and this engagement causes switch 38 to remain in the depressed position. Once the thermostat contacts 42 close, there is now coincident operation of switch 38 and thermostat 40 and current can flow in the current path 30 including relay winding 34. The relay 32 thus becomes energized, causing armature 36 to move to its upper limit (FIG. 3). Contact 50 closes and current now flows in path 28 to provide a fast charge of battery 22.

The movement of armature 36 is sufficient to cause disengagement between armature arm 54 and switch detent 48. Switch 38 is thus returned to its unactivated position by the action of biasing spring 46. However, contact 52 remains in the closed position because it is now being held by armature 36 of the actuated relay 32.

Returning now to the alternative operation of the circuit when switch 38 is depressed, if the thermostat contacts 42 are already in the closed position by virture of the temperature of battery 22 being below the predetermined level, then there is immediate operational coincidence of switch 38 and thermostat 40. Again, arm 54 of the armature 36 is moved upward by engagement with the ramp of detent 48. However, when contact 52 closes, current path 30 is completed, and current flows through winding 34 to energize the relay. Armature 36 moves upwardly to close contact 50 and to hold contact 52 in the closed position. Arm 54 does not latch detent 48 (or latches only momentarily as the winding 34 becomes charged), and switch 38 is returned to its disengaged position by spring 46. A fast charge of the battery 22 can now be effected via current path 28.

From the preceding description it can be seen that relay contact 52 serves an additional function. This function is as the latching or locking contact for relay 32 when it is energized. Current can thus flow through path 20 including winding 34 even though switch 38 has been released because armature 36 holds latching contact 52 closed and current path 30 remains unbroken. Current continues to flow in current path 30, and current path 38 as well, until such time as thermostat contacts 42 open in response to the battery temperature rising to the predetermined level due to completion of charge. Once these contacts open, current flow in path 30 ends, relay 32 becomes deenergized, and the downward movement of armature 36 opens contacts 50 and 52. The fact charging current is removed from battery 22, and the battery charging circuit has now returned to its original or preoperative condition shown in FIG. 1.

Contacts 50 and 52 are preferably flexible contact springs conventionally used in relays. This construction permits closed contact 52 to flex or bow sufficiently in response to armature movement (FIG. 3) to permit armature 36 to close contact 50. Once the armature is withdrawn, the spring construction returns both contacts to their original normally-open position. In FIG. 1 a resistor 56 is shown connected in parallel with contact 50. Resistor 56 preferably is as a large resistor so that current is applied at a trickle or very low rate whenever contact 50 is open. Thus, whenever the charging circuit is not in the fast charging mode, it is switched to a trickle charge mode so that a low level charge is applied to the battery 22 to keep it in a fully charged state until it is removed from the battery charging circuit. Also in FIG. 1 a diode 58 is shown connected in charge path 28, its purpose being to prevent discharge of a charged battery. There is also shown in FIG. 1 a lamp 60 connected between current path 30 and junction point 16. Lamp 60 becomes lit whenever contact 52 is closed to indicate that the battery charging circuit is in its fast-charge mode.

Under normal conditions of operation, battery 22 will be inserted or switched into charging circuit 10, and switch 38 will be depressed to initiate a fast charge. The temperature of the battery is here assumed to be below the predetermined level so that contacts 42 of thermostat 40 are closed. Thus, when switch 38 is depressed, contact 52 closes to permit current flow through winding 34, and the relay 32 becomes energized. Contact 50 is closed by armature 36, and fast charge of battery 22 begins by the flow of a high charging current in path 28.

As discussed earlier, and with particular reference to a Ni-Cd battery, the attainment of a full charge is accompanied by an abrupt increase in battery temperature. As battery 22 approaches full capacity, the temperature of this battery undergoes this sharp increase and exceeds the preset level of thermostat 40. Contacts 42 open and current ceases to flow in path 30. Relay 32 becomes deenergized and both contacts 50 and 52 now open. Resistor 56 is thereby placed in the charge path of battery 22, and the charging current is reduced to a small steady flow known as a trickle current. Lamp 60 which was illuminated during the fast charge of battery 22 goes dark indicating that the recharging of battery 22 has been completed and this battery can be put into service.

Assume now that this fully-charged battery 22 is put into immediate operation in battery-driven apparatus and is heavily used so that as the battery discharges the current flow is sufficient to keep the battery temperature above the level set for closure of the thermostat contacts. If this battery is again connected into charging circuit 10 and push button 38 depressed, no current flows in current path 30 even though contact 52 is closed. However, switch 38 is maintained in its depressed position by armature arm 54 which latches detect 48 (FIG. 2). Lamp 60 becomes lit to indicate to the user that the circuit is in the fast charge mode.

The illumination of lamp 60 in this case actually means that the circuit memory is now in control of battery recharging and that a fast charge of the battery will begin once battery temperature has decayed to a safe level. The user is thus freed from having to attempt repeatedly to recharge the battery as is done with prior art circuits, and also has no need to try to circumvent the thermostat safety features and possibly create a hazardous situation. To the contrary, the illumination of lamp 60 indicates to him that recharging of the battery is assured and that no further action on his part is necessary even though within the battery charging circuit fast charging of the battery is temporarily prevented.

However, as stated above, the memory feature of the charging circuit is now in control of recharging and will initiate a fast charge once battery temperature has decayed to the safe level where contacts 42 close. When this occurs, there is a complete path for the flow of current between junctions 14 and 16. Relay 32 operates, contact 50 closes, and the battery charger is once again in the fast charge mode (FIG. 3). When battery 22 has again become fully charged, contacts 42 open and the relay drops out. Lamp 60 does dark indicating to the user that the battery is charged and can be removed and placed in service.

It will be apparent to those skilled in the art that various modifications and variations can be made in the battery charging circuit of the invention without departing from the scope or spirit of the invention.

What is claimed is:

1. A battery charging circuit adapted to be supplied with a source of current and to charge a battery by the application of current thereto, said circuit comprising:
   a. a first current path for the current supplied by the source and adapted to contain the battery to be charged;
   b. a second current path for the current supplied by the source;
   c. a relay having a winding connected in said second current path;
   d. coincidence means for completing the second current path and permitting current flow through said relay winding to actuate said relay including:
      1. a manually operable switch, and
      2. a thermostat thermally coupled to the battery and designed to be actuated when the battery temperature is below a predetermined temperature, the coincident actuation of said manually operable switch and said thermostat causing the completion of the second current path;
   e. means responsive to the actuation of said relay for permitting current flow through said first current path to said battery; and
   f. holding means for retaining said manually operable switch in the closed position after manual operation thereof until said thermostat actuates.

2. A battery charging circuit as claimed in claim 1, where said thermostat has contacts connected in series with said relay winding in said second current path, said contacts being closed when said battery temperature is below said predetermined temperature.

3. A battery charging circuit as claimed in claim 2, wherein:
   a. said relay has an armature, and
   b. said permitting means includes a first normally-open contact of said relay connected in said first current path and responsive to the movement of said armature to be closed thereby when said relay is actuated.

4. A battery charging circuit as claimed in claim 3, further comprising:
   a. a resistor connected in parallel with said relay contact to permit a trickle current to flow through said first current path when said first contact is open.

5. A battery charging circuit as claimed in claim 1, wherein:
   a. said permitting means includes a first normally-open contact of said relay which closes in response to the actuation of said relay, and
   b. said relay further comprises a second normally-open contact operably connected to said second current path, said manually operable switch being coupled to said second contact to effect manual closure of said second contact upon actuation of said manually operable switch.

6. A battery charging circuit as claimed in claim 5, wherein said second normally-open contact is connected directly in said second current path in series with said relay winding to additionally serve as a holding latch for said relay upon actuation thereof.

7. A battery charging circuit as claimed in claim 6, wherein said thermostat has contacts connected in series with said relay winding in said second current path, said contacts being closed when said battery temperature is below said predetermined temperature.

8. A battery charging circuit as claimed in claim 1, wherein:
   a. said permitting means includes a first normally-open contact of said relay which closes in response to the actuation of said relay and wherein said relay further comprises:
   b. a second normally-open contact connected in series with said winding in said second current path, and
   c. an armature coupled to said first and second contacts.

9. A battery charging circuit as claimed in claim 8, wherein said holding means includes:
   a. a detent positioned to contact said armature and be retained thereby upon actuation of said manually operable switch.

10. A battery charging circuit as claimed in claim 8, wherein:
    a. said manually operable switch is coupled to said second contact to effect manual closure thereof and said holding means includes:
       1. a detent positioned to contact and move said armature upon actuation of said manually operable switch to effect closure of said second contact, and
       2. said armature includes a bar formed thereon which engages said detent upon actuation of said manually operable switch and which releases said detent upon movement of said armature in response to the actuation of said relay.

11. A battery charging circuit as claimed in claim 10, wherein said thermostat has contacts connected in series with said relay winding in said second current path, said contacts being closed when said battery temperature is below said predetermined temperature.

12. A battery charging circuit adapted to supply a charging current from a source to a battery, said circuit comprising:
    a. means defining a first current path for supplying current from the source to the battery;
    b. means defining a second current path in parallel with the portion of said first current path which is adapted to include the batteries;
    c. switch means in said first current path controlled by current flow through said second current path;
    d. a thermostat adapted to be placed in said second current path and adapted to be thermally coupled to the battery;

e. manually operable, normally-open switch means in said second current path;

f. latch means for holding said manually operable switch means in the closed position; and g. means responsive to the flow of current in said second current path for releasing said latch means, holding said manually operable switch means closed and closing said switch means in said first current path.

13. A battery charging circuit adapted to be supplied from a source of current and for charging a battery by the application of current thereto, said circuit comprising:

a. thermostat means thermally coupled to said battery for controlling the flow of current thereto;

b. manually operable switch means for controlling the flow of current to said thermostat and the battery;

c. latch means for holding said manually operable switch means in the closed position; and d. electrical means for holding said manually operable switch means in the closed position while releasing said latch means in response to the flow of current therein.

* * * * *